Oct. 10, 1972　　　G. W. VON HOFE　　　3,697,300

CONTINUOUS STRIP OF LABEL WEB

Filed July 29, 1970　　　　　　　　　　5 Sheets-Sheet 1

INVENTOR

GEORGE W. VON HOFE

BY John J. Hart

ATTORNEY

Oct. 10, 1972  G. W. VON HOFE  3,697,300
CONTINUOUS STRIP OF LABEL WEB

Filed July 29, 1970  5 Sheets-Sheet 5

INVENTOR
GEORGE W. VON HOFE
BY
John J. Hart
ATTORNEY

United States Patent Office 3,697,300
Patented Oct. 10, 1972

3,697,300
CONTINUOUS STRIP OF LABEL WEB
George W. von Hofe, Millington, N.J., assignor to New Jersey Machine Corporation, Hoboken, N.J.
Continuation-in-part of application Ser. No. 523,756, Jan. 28, 1966, now Patent No. 3,536,550. This application July 29, 1970, Ser. No. 59,151
Int. Cl. H01f 10/00
U.S. Cl. 117—15   10 Claims

ABSTRACT OF THE DISCLOSURE

A continuous web having a plurality of items such as labels printed successively along the web and including a first series of control elements each of which is located in a given position on the web relative to one of the items, and a second series of control elements located at different positions on the web relative to such items.

---

This application is a division of patent application Ser. No. 523,756, filed Jan. 28, 1966 and on which issued Pat. No. 3,536,550, dated Oct. 27, 1970.

This invention relates to labels for articles such as bottles, containers, tubes, etc., and is particularly concerned with the manufacture of a continuous web of labels provided with register means for control purposes, the detection of such register means in the feed of the continuous web for purposes of label verification and registration, and the control thereby of devices such as means for controlling the operation of the machine, for cutting individual labels and removing waste from the web, and for registering the web with respect to certain mechanisms.

Labels in a continuous web, often referred to as roll labels, are usually successively printed on the web as the latter is intermittently fed past a printing device. Finely detailed labels such as are used in the drug trade are usually printed by the well known letter press process which, while it has certain advantages, is not entirely satisfactory because of many disadvantages that are inherent in the means for practicing it. Thus, the plates used in this process are expensive, its practice requires the employment of experienced printers, and it is difficult to adapt this process to the label field and produce quality results. Furthermore, the letter press process is a relatively slow and expensive method of label printing. It is recognized by the art that another well known process of printing known as offset printing has many advantages over the letter press process for producing finely detailed labels, but up until now there has been no economically known way of utilizing this superior process to produce labels in roll form. This is principally due to its inflexibleness in cut off length resulting from the gap between the ends of the plate or blanket and the fact that the cylinders are all of the same fixed size because of the design of the press.

Another factor which has proved troublesome to the art in connection with continuous webs of labels, is concerned with the register means that have heretofore been employed for control purposes. These prior register means usually take the form of holes punched in the web, or visible marks printed on the web and in either case it is necessary to provide such register means in a particular location on each label in order that such register means may be removed from the label after it has performed its intended function, or if left on will interfere as little as possible with the printed and design features of the label. However, if such register means is not removed from the label, which requires an additional operation in the label's preparation, it will always detract to some extent from the appearance of the label.

One of the objects of the invention therefore is to provide an improved arrangement of the labels and control elements on a continuous strip of label web which is particularly suitable when such labels are printed by offset printing procedures.

Other objects of the invention, as well as the advantages and novel features thereof will appear from a perusal of the following description when read in connection with the accompanying drawings, in which FIG. 1 is a schematic layout of a rotary web offset printing press for printing roll labels in accordance with the invention;

Figure 1:
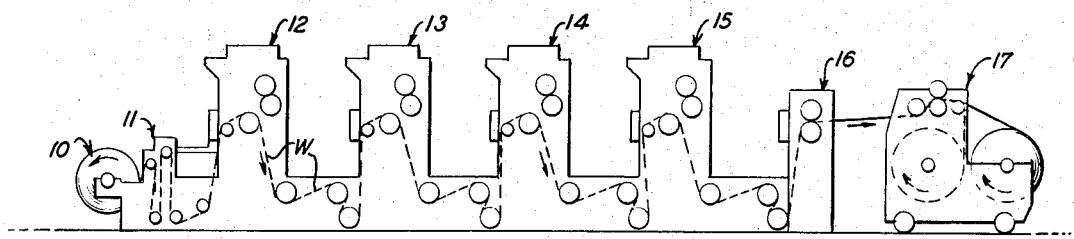

The invention may be practiced as a continuous operation, but it is most advantageously practiced as a two step operation in which the webs of labels embodying the invention are first made in a rotary web offset printing press embodying the invention, and are then utilized in a labeling machine embodying the features of the invention. FIG. 1 of the drawings shows a schematic layout of a suitable offset printing press that may be utilized for printing rolls of webs provided with labels suitable for use on containers for ethical drugs. The several units constituting the press are of known construction and include an unwind station 10 at which a roll of continuous paper web W of a width sufficient to permit the printing thereon of multiple rows of labels, is rotatably supported. The web from the supply roll initially passes through a tension control unit 11 and then may pass through a plurality of printing units 12, 13 and 14 for successively printing on the web in superposed relation the required number of images necessary to form the complete labels. The printed web then may pass through a coating unit 15 for applying a protective coating to the labels. From the coating unit 15, the web may pass through a rotary punching unit, the purpose of which shall be hereinafter more fully explained, and then through a slitting and rewind unit for slitting the web lengthwise into a plurality of label strips and rewinding the slit strips into label rolls in a manner well known to the art.

Figure 2:
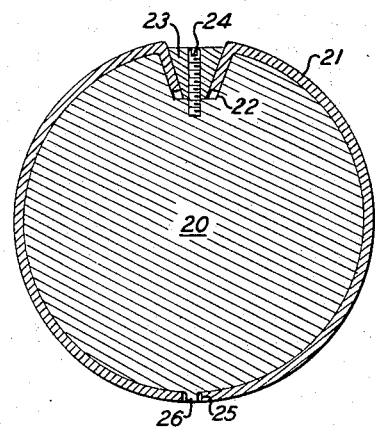
FIG. 2 is a diagrammatic vertical sectional view of a printing roll in an offset press.

Each of the printing units 12, 13 and 14 in an offset web press of the type depicted in FIG. 1 of the drawings, is composed of a printing cylinder 20 in FIG. 2, on the exterior surface of which is mounted the printing plate 21. The ends of the plate 21 are bent down into a longitudinal groove 22 provided in the cylinder and may be fastened to the cylinder by a wedge-shaped member 23 tightened in wedged relation in the groove 22 by a plurality of set screws 24 to secure the printing plate 21 to the cylinder. Thus, across the mouth of the groove 22 there is a gap approximately ¼ inch wide throughout the length of the cylinder and in the direction of the widths of the labels to be printed on a web, which prevents the application of printed matter to those portions of the web which extend over such gap in the feed of the web.

Figure 3:
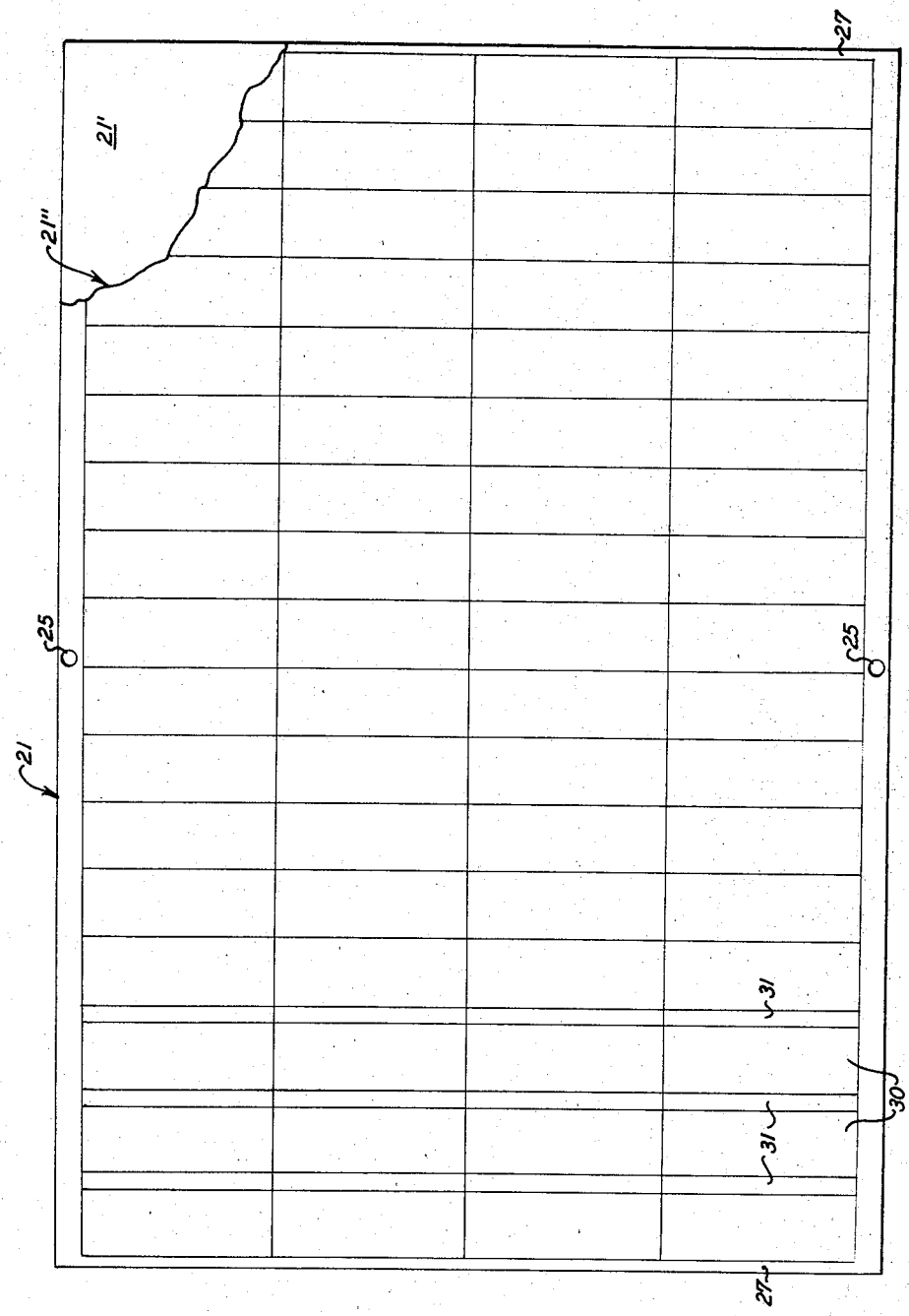
FIG. 3 is a plan view of a printing plate embodying the invention.

The printing plate 21 is preferably a photosensitized plate such as is commonly used in the practice of the offset process. Plates of the preferred type are usually composed of a flexible plate metal backing 21' on which is applied a layer 21" of the photosensitive emulsion. Exposure of the plate may be made by a carbon arc, or any equivalent intensity source. The printing plates 21 are each provided along the sides thereof with two registering holes 25 (FIG. 3) which register with pins 26 in FIG. 2 provided on the printing cylinder 20 to enable the ready and proper placement of a printing plate on the printing cylinder. Preferably as shown in FIGS. 2 and 3, the pins 26 are located on the printing cylinder 20 diametrically opposite the groove 22 thereof and the registering holes 25 are located at the centers of the two side edges of the plate 21, so that the center of the plate will be held fixed by the pins thereby enabling the plate to be properly wrapped around the cylinder and the two ends thereof properly registered in the groove 22. The importance of this feature will be realized when it is understood that the end margins 27 of the plate which are tucked into the groove 22 for securement by the wedge member 23, are quite narrow in width, for example, of the order of ⅛".

Between the two margins 27 of the plate 21 the sensitized area thereof is provided with the areas 30 of label material for a given product which are to be printed on the continuous paper web W. The label areas 30 are laid out so that the height of the labels extends lengthwise of the plate and will be wrapped around the printing cylinder, and so that a plurality of rows of such label areas are provided across the width of the plate; there being four rows provided in the plate shown in FIG. 3 of the drawings. The length of the plate 21 between the end margins 27 thereof is a given fixed length because offset printing presses are usually constructed for printing cylinders of a given diameter. It has been determined that the heights of labels most commonly employed in the container labeling art range from about six inches maximum height to ¾ inch minimum height and vary in small steps between these two limits. It has been found also that plates 18 inches in length, if constructed in accordance with the invention, may be utilized to print the labels falling within such given range. With a plate 18 inches long, there will be provided a given or predetermined fixed printing repeat length of 17¾ inches because of the two ⅛ inch end margins 27 which must be utilized to secure the plate to the printing cylinder. There will of course be certain sized labels the multiple areas 30 of which will exactly fit within such given fixed repeat length, but the heights of most labels within the stated range will not have a repeat length which is exactly the same as such given fixed repeat length. In accordance with the invention, this problem is overcome by dividing the fixed printing repeat length by the height of the label between the parameters set and which it is desired to print for a given product, to obtain the whole number of label areas 30 which can be printed along the web by one revolution of the plate. There will be a remainder, utilized as a whole, if not more than 1½ inches, or may be divided into equal increments of not less than ¼ inch and not more than 1½ inches. The printing plate 21 is then prepared repeating the label areas 30 as many times as the whole number thereof, and spacing certain of such label areas by the amount of the increment or increments constituting the said remainder. The increment or increments, if a multiplicity thereof, may be arranged in any suitable manner on the plate. For example, as is shown in FIG. 3 of the drawings, such increments 31 which are three in number and ¼ inch in height, are located between the first four label areas 30 on the left hand side of plate 21, as viewed in such figure, and the remaining label areas 30 arranged in abutting relation. The label areas shown are one inch in height so that there are 17 of them provided lengthwise in the plate print length of 17¾ inches. The thus prepared printing plate 21 is then mounted on the printing cylinder 20 in the manner described and the press operated to print the labels on the web W.

It will be understood from the foregoing that a label web produced as aforesaid in accordance with the invention, will have printed thereon certain labels which will be spaced apart by the increments 31 provided on the plate and by the ¼ inch gap at the ends of each given fixed repeat length of the plate 21, and other labels which will be connected together without any intervening spacing web portion. In other words, certain of the successive labels on the web will be spaced apart by given amounts, and other successive labels on the web will abut each other, and this pattern of spaced and abutting labels set on the printing plate will be repeated throughout the length of the web. In order that a label web of this type may be employed in a labeling machine, it is necessary that such machine be provided with means for severing both the abutting labels and the spaced labels on the web and for eliminating the web portions which separate the spaced labels. In accordance with the invention this is accomplished by providing on the web indicia for properly registering the abutting and spaced labels on the web with the cutting mechanism of the labeling machine, and for controlling the operation of such cutting mechanism which is constructed so that it is capable of making single cuts to sever abutting labels and of making double cuts to eliminate the web portions between spaced labels.

Figure 4:
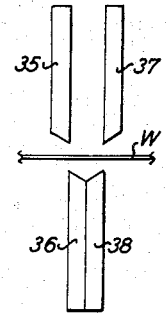
FIG. 4 is a diagrammatic elevational view of the cutting mechanism.
Figure 5:
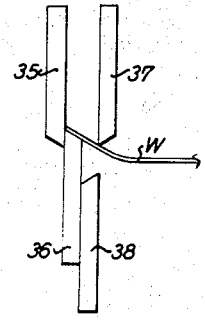
FIG. 5 is a view similar to FIG. 4 and showing the operation of one set of cutting blades.
Figures 6, 7:
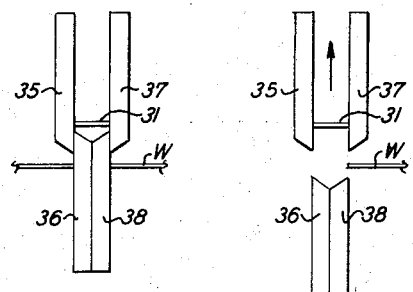
FIG. 6 is a view similar to FIG. 4 and showing both sets of blades cutting the web.
FIG. 7 is a view similar to FIG. 6 indicating the manner in which the cut chip is removed.

It is believed advisable for an understanding of the invention to first consider the mechanism for cutting the labels from the web. Considering now FIGS. 4 to 6 of the drawings, it will be noted that the cutting mechanism includes a pair of cooperative blades 35, 36 which reciprocate toward and away from each other along fixed paths to cut the web W in the manner shown in FIG. 5. Not only are the blades 35, 36 fixed against movement along the run or travel of the web W once they have been properly adjusted for the label size to be cut, but their cutting action cannot be interfered with during the normal operation of the machine. Associated with the blades 35, 36 are a second pair of cooperative blades 37, 38 which also reciprocate toward and away from each other to cut the web W. When the labels registered with the cutting mechanism are in abutting relation, the blades 37, 38 are latched in inoperative position and the blades 35, 36 only will operate to sever from the web the leading one of such abutting labels. When, however, a pair of labels joined in spaced relation by an increment 31 is advancing into registry with the cutting mechanism, the blades 37 and 38 are caused to be unlatched so that on the next operation of blades 35, 36, blades 37, 38 will move with them and both sets of blades will simultaneously sever from the web the increment 31 joining the spaced labels as shown in FIG. 6. The cut increment 31 or chip may be removed upwardly between the blades 35, 37 as shown in FIG. 7, by known types of vacuum machines used for this purposes in the art.

Figure 8:
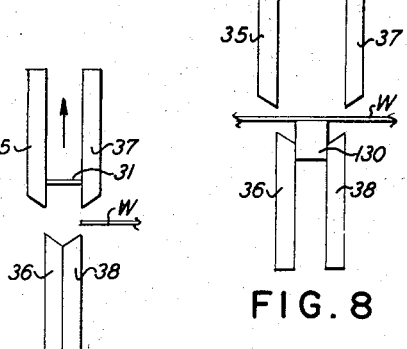
FIG. 8 is a view similar to FIG. 4 but showing the sets of blades adjusted to cut a chip of larger size.
Figure 9:
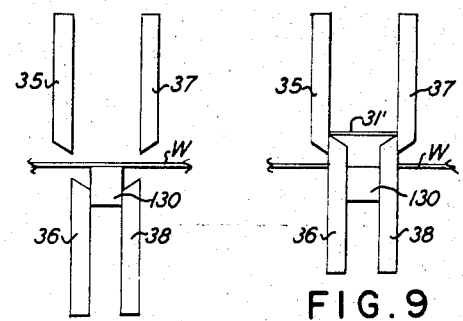
FIG. 9 is a view similar to FIG. 8, but showing the adjusted blades cutting the wider chip.

FIGS. 4 to 7 of the drawings show the two sets of blades 35, 36 and 37, 38 set for the removal from the web W of increments 31 of the smallest size, namely ¼ inch. When increments 31 of greater height are to be severed from the web, the set of blades 37, 38 are shifted as a unit away from the set of blades 35, 36 and along the line of travel of the web until they are spaced from the set of blades 35, 36 the desired distance, as shown in FIG. 8 of the drawings. When the two sets of blades are next operated in unison they will cut the larger sized increment or chip 31' shown in FIG. 9. The shifting of the set of blades 37, 38 is preferably accomplished manually by means of a micrometer adjustment which is built into the cutting mechanism and which is constructed to enable the sets of blades to be accurately adjusted to cut any size of increment in the aforesaid range thereof between the minimum of ¼ inch and the maximum of 1½ inches.

The registration of the labels with the set of cutting blades 35, 36 and the operation of the set of cutting blades 37, 38 are controlled by the coaction of control elements provided on the web and a scanning device located along the path of feed of the web at least one repeat length of web (18 inches in the case of the printing plate illustrated in FIG. 3 of the drawings) upstream from the line of cut of the set of cutting blades 35, 36. Thus, there are provided on the web a set of control elements for registering the labels with the cutting blades 35, 36, these being one of such elements for each label and each of such elements being associated with a label. There are also provided on the web separate control elements for controlling the operation of the blades 37, 38 and these control elements are equal in number to the number of increments provided on the web and each is located on the web in advance of or downstream from an increment. It will be understood, that while particular control elements are associated with particular labels and increments on the web, the coaction of such elements in a particular repeat length of web while the scanning means does not control the cutting of the labels and increments in that particular repeat length of web, but controls the cutting of similarly located labels and increments in the repeat length of web in advance of such particular repeat length due to the spacing of the cutting and scanning means.

Figure 10:
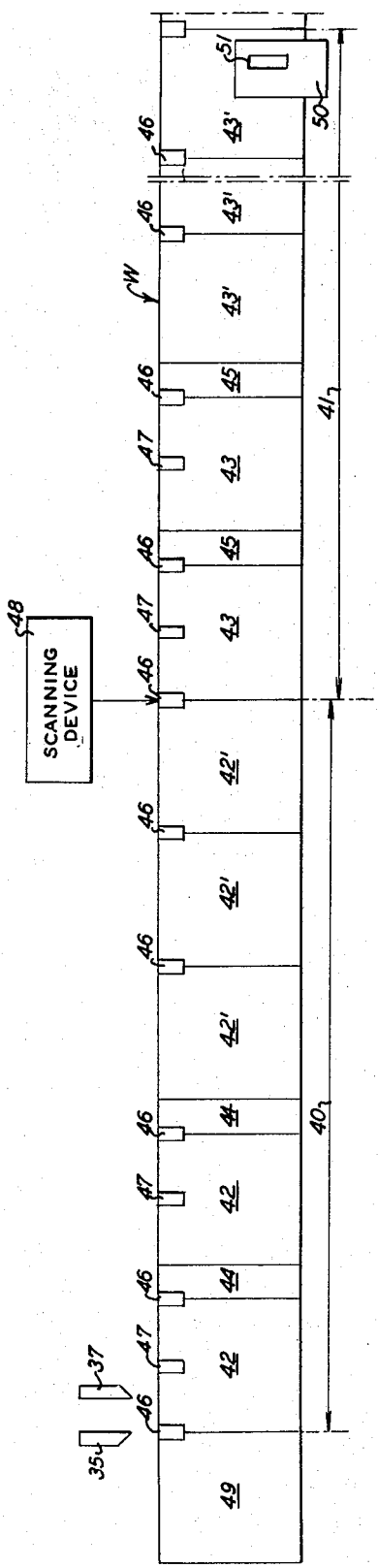
FIG. 10 is a diagrammatic view illustrating the method of controlling the registration of the label web relative to the cutting means and the operation of the latter.

It is believed that a better understanding of the aforesaid operation will be understood from a consideration of FIG. 10 of the drawings which shows a portion of a label web W of a length containing two repeat lengths designated 40 and 41 and each of which is provided with five labels. Two of the labels 42, 42 and 43, 43 in such repeat lengths 40, 41, respectively, are spaced from each other and the remaining three labels 42', 43', respectively, by space increments 44, 45, respectively. The remaining labels 42' and 43' are connected together in abutting relation. Associated with each of the labels 42, 42', 43 and 53' are control elements 46 for controlling the registration of the labels with the fixed or continuously operable set of knife blades 35, 36 only the former of which is indicated in FIG. 10 and which are located in an adjusted position relative to the line of feed of the web dependent on the size of the labels. Associated with the set of knife blades 35, 36 is the intermittently operable or adjustable set of knife blades 37, 38, only the upper one of which is indicated in FIG. 10, and which are spaced from blades 35, 36, a distance equal to the height of the increments 44, 45. Control elements 47 for controlling the operation of the blades 37, 38 are located on the web in advance of the increments 44, 45. In the arrangement shown, the control elements 46 and 47 are aligned along one edge of the web making it possible to employ one scanning device to control both the registration of the labels and the operation of blades 37, 38. It will be understood however, that the knife signal control elements 47 may be placed on the web in non-aligned relation with the register control elements 46 so that in situations where it is considered desirable two scanning devices may be employed; one to control the registration of the labels and the other to control the operation of blades 37, 38. A scanning unit 48, which preferably comprises at least one scanning device constituted of an electric eye, is located at least one repeat length of web upstream from the set of cutting blades 35, 36. With a printing plate dimensioned as the plate 21 previously discussed, the scanning unit or device 48 would be positioned upstream from the cutting blades 35, 36 exactly 18 inches so that it will be scanning a control element 46 located the repeat length of web 41 at the same time a similarly located control element 46 in the repeat length of web 40, is positioned at the line of cut of the blades 35, 36.

With the foregoing in mind and assuming that the direction of label feed is to the left, as viewed in FIG. 10, it will be understood that in the operation of the apparatus, the web W will be fed by the web feedinf means of the label machine in a step-by-step fashion so that in the periods of dwell thereof the register control elements 46 associated with the terminal labels will stop at the line of cut of the blades 35, 36 and another register control element 46, one repeat length back of such registered control element in the repeat length of web 41, will stop at the scanning device 48. This step-by-step registration of two similarly located register control elements in the two repeat lengths of label web and spaced one repeat length apart, will occur during each period of dwell in the feed of the web W. The step-by-step movement imparted to the web by the web feeding means is controlled by the scanning means 48, which every time a register control mark 46 is scanned thereby causes the sending of a signal to the web feeding means to stop the feed of the web. The set of knife blades 35, 36 are thereupon automatically operated to sever the terminal label 49 from the web. Between the periods of dwell the knife signal control elements 47 also will pass by the scanning means 48 and cause the latter to send a signal that will effect the unlatching of the set of blades 37, 38 so that on the next operation of the two sets of blades they will cut double to remove a chip of paper, as has been explained. Wherever in the web there is not provided a control element 47 between two control elements 46 because there is no following increment 44 or 45 to be removed, there will be no transmitted signal for unlatching the blades 37, 38 and the blades 35, 36 only will operate to make a shear cut.

The scanning means 48 performs an additional function through the register control elements 46 as the label web travels through the machine. Located approximately one repeat length of web in back of the scanning means 48 is an imprinter 50 which is positioned so that the same given area portion 51 of successive labels will come into the field of printing of the imprinter 50 as the web successively stops because of the registry of the control marks 46 with the scanning device 48. When the scanning device 48 sends a signal to stop the feed of the web, it simultaneously sends a signal to the imprinter 50 causing it to operate to imprint on the area portion 51 of a label the information that is required to be added to a label at the time it is being applied to a container for a given product and which in the case of pharmaceutical products may be the batch number of the material being packaged, the expiration date for the safe use of such material, the date of packaging, etc. This information is usually applied to a label in the form of a code number.

Considering the aforesaid system of operation as a whole, it may be noted that at the start of a cycle of operation of the labeling machine, the construction is such that the electrical circuit in which is contained the scanning device 48 is switched to the set of blades 37, 38 so that in the initial travel of the web through each step-by-step movement thereof from a period of dwell, the scanning device 48 will look for a knife control element 47 on the label being scanned. If the scanning device detects a control element 47 it will send a signal to cause the unlatching of the set of blades 37, 38 as aforesaid, and if no control element is detected the circuit remains inactive. Shortly after the period in which a control element 47 should be detected, if present, on the label being scanned, the electrical circuit is switched to control the feed rolls of the feeding means and the imprinter 50. When the scanning device now detects a control element 46, it will simultaneously stop the feed rolls and actuate the imprinter to print a code number on the given area portion 51 of a label during the dwell of the web. The circuit is constructed so that if the scanning device does not send a signal as a result of its detection of a control element 46 within a given period of time after such signal should have been received and before the termination of the cycle of operation of the machine, the circuit operates to stop the machine.

The register control elements 46 and the knife control elements 47 are provided on the label web W at the time the labels are printed thereon and may be in the form of punched holes, or in the form of suitable indicia printed on the web. If such control elements are to be in the form of punched holes, such holes are provided in the web in a known manner by the punching unit 16 of the printing press shown in FIG. 1 of the drawings after the labels have been printed on the web and a protective coating has been applied to such web.

If the control elements 46, 47 are to be applied to the web in the form of printed indicia, such indicia may be visible to the human eye, or to detecting means under ambient light, or light of a given wave length, or such indicia may be invisible to the human eye or to detecting means under ambient light, but visible under a light of a given wave length. Such indicia also may be composed of a combination of such visible and invisible as aforesaid may be detectable by other means such as optical-electrical and magnetic-electrical detecting means. Thus, the indicia may be composed of the visible printing inks employed in printing the labels and if such indicia does not form a desired part of the printed label itself, the latter is preferably located on the label web outside the areas of label indicia thereon. Also, and especially in the case of verification, the indicia may be composed of characters which form part of the printed label and which may readily be recognized optically from the remaining printed characters on the label. Further, in accordance with the invention, the control elements may be applied to the label web with inks which are different from the inks usually employed in printing the labels and have characteristics which enable them to be readily distinguished by the scanning means from the usual printing inks. For example, it has been found that known magnetic or luminescent inks may be employed for these purposes. The luminescent ink employed may be in the form of an invisible fluorescent ink of a type such as are now available to the art. Inks of this type cannot be seen by the human eye in ordinary daylight and may therefore be applied anywhere desired on the printed label without regard to the label indicia printed thereon. Different kinds of these invisible luminescent inks may be recognized by different photo tubes according to their spectral sensitivity characteristics and this quality may be taken advantage of to use particular luminescent inks for different kinds of products. Thus, for a given product a luminescent ink that would emit red light could be applied to labels for such product. Accordingly, if labels carrying control elements made of a luminescent ink having a different spectral characteristic were placed in the machine, the machine could not be started and the error in the use of the wrong labels would be detected. By this means label verification as well as control of operating instrumentalities in the labeling machine can be developed according to the requirements desired of the labeling machine in the uses thereof. The luminescent ink may also be a visible fluorescent ink of a type such as is known to the art. Certain of these inks have the quality of becoming invisible when light is excluded and become excited under certain spectral wave lengths, such as ultra-violet light. It is also possible to use inks of the phosphorescent variety to good advantage on the label webs.

Figure 11:
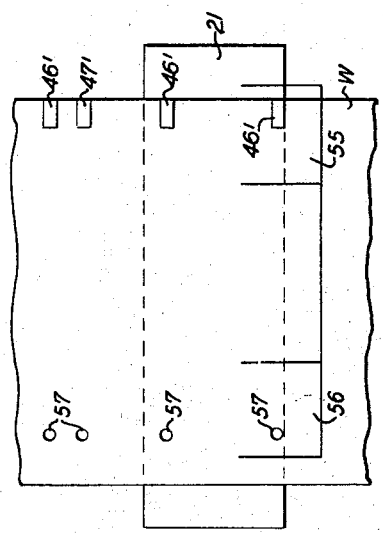
FIG. 11 is a partial schematic top view showing the manner in which a split ink fountain may be associated with the printing plate in accordance with the invention.

In order to keep visual track of the registration between the visible printed inks employed in the label indicia and the control elements made of invisible luminescent ink, there may be provided on the label web in combination with the invisible control elements, visible elements or marks which will enable the press operator to be sure that the invisible mark is being printed. This may be accomplished by providing the printing press with a split ink fountain arranged to have both the visible and invisible inks picked up by the offset plate. Thus, as shown in FIG. 11 of the drawings, the offset printing plate 21 picks up from the fountain portion 55 the invisible ink which is to be used to produce the control elements 46', 47' on the web W, and picks up from the fountain portion 56 the visible ink which is to make up the visible portion of the mark, for instance, circles 57 printed along the margin of the web in registration with the invisible control elements 46' and 47'. These visible register circles may be trimmed off the web in the slitting and rewinding unit 17 of the press or may be applied to portions of the web which are to be cut out when the labels are severed therefrom in the label machine. As the labels are being printed with the invisible inks they should be regularly examined by an ultra-violet light testing device attached to the printing press so that the effectiveness of the register mark can be checked out at the time of printing. This can be done on a stroboscopic basis with the testing device movable over the printing range so that the labels can be checked out during the run. In order to get the stroboscopic light to function properly when the labels are not uniformly spaced, the light must be triggered by the register marks 46. This means that the register marks 46 and the knife action marks 47 must be in different channels for this purpose.

The scanning device which may be employed for labels having punched holes preferably is an electronic pick-up device of the "look through" type in which the detecting beam of light passes through a punched hole to a receiver as the hole comes into registry with the device. Scanning devices of the reflective type may be employed when the control elements are printed on the web. When using verification applied to unprinted portions of the tape, the "look through" type of scanning is the simplest approach because the ink spots will always be located on clear, unprinted portions of the paper, i.e., no opaque inks will be printed in the areas used to print such verification spots or control marks. It has also been found, that in the use of luminescent inks which are to be detected by their spectral characteristics, the "look through" type of scanning device can be used to best advantage in connection with labeling machines. In this method of detection for invisible control elements, the light source for generating the particular wave length desired for a given type of luminescent ink is on the side of the web on which the luminescent ink is printed, and the pick-up tube having the necessary qualities to receive the light passing through the paper is located on the other side of the web so that the control elements pass between such source and tube. When printing the control element to be used in connection with the "look through" method of detection, it is desirable to print the invisible ink on a portion of the label where no substantial portion of the visible opaque inks used in printing the label indicia overlap the control element. It has been found practical to make the size of the control element approximately 3/32" x 1/2", the 1/2" dimension being preferably across the direction of movement of the web.

Figure 12:
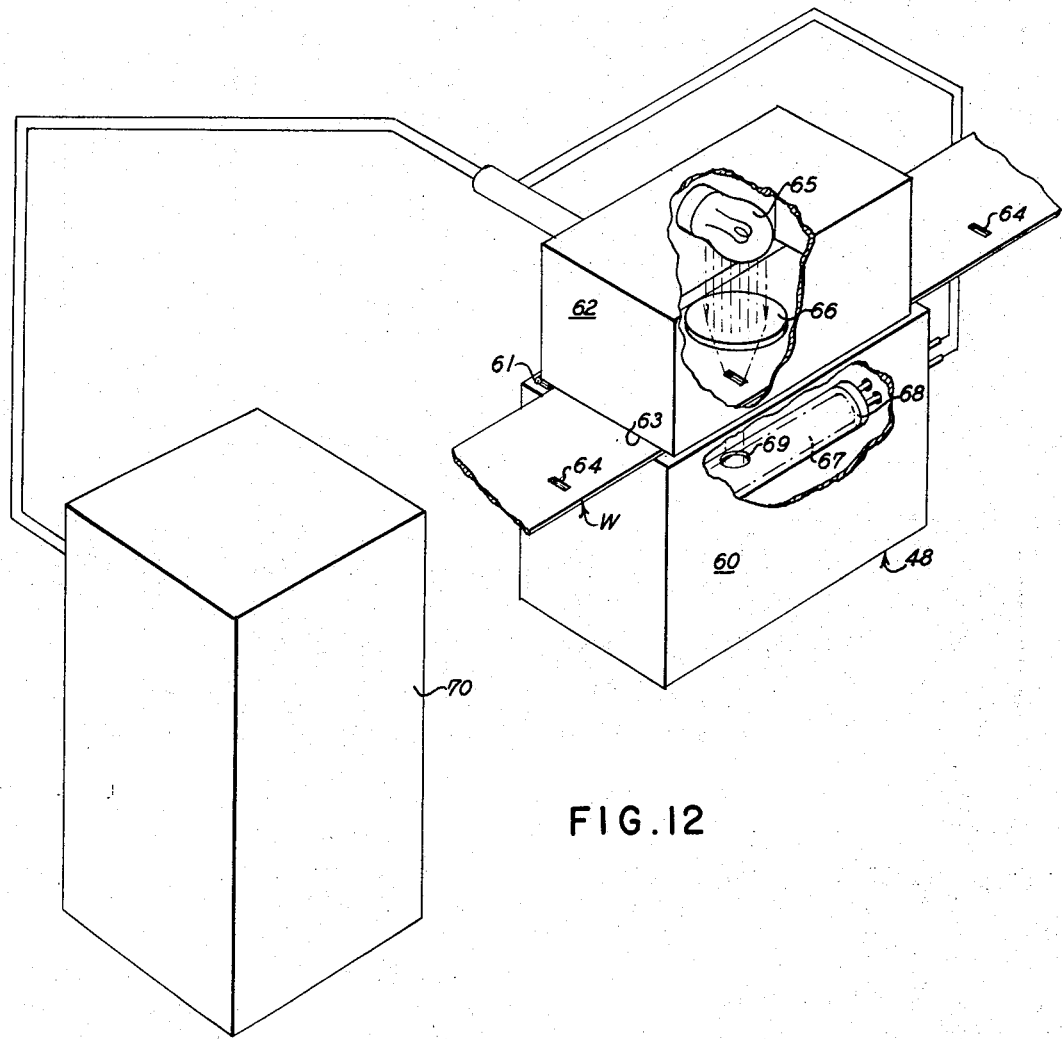
FIG. 12 is a diagrammatic, perspective view of the scanning means employed for detecting luminescent control elements.

FIG. 12 of the drawings illustrates a scanning device that has been found particularly advantageous in scanning luminescent control elements by the aforesaid "look through" procedure. This scanning device includes a box-like base 60, to the top wall of which, is pivotally connected by means of a hinge 61, a box-like cover 62. The bottom of the cover 62 is open and the end walls thereof are provided with slots 63 through which the label web W passes in its feed through the label machine. As the web travels through the scanning device, it rests on the top wall of base 50 which is provided with an opening of larger area than that of the luminescent control elements 64 provided on the label web. Mounted in the cover 62 above such opening is a bulb 65 for creating the spectral light beams of the desired wave length, for example, ultra-violet light. The light beams created by the bulb 65 are directed through a lens 66 which concentrates the beams into an area substantially equal to the area of the control elements 64 and causes a control element coming into registry therewith to visibly glow. The visible light created by the ultra-violet light passing through a luminescent control element 64 passes through the paper of the web and through the opening in the top wall of the base 60, and is picked up by a receiver or phototube 67 located in the base 60 and contained in a metal cylinder 68 provided with an opening 69 to permit the passage of such visible light to the receiver. The interior walls of the base 60 are painted black and the construction of the base and cover is such that substantially all ambient light is prevented from entering into the interior of the scanning device. Power for the bulb 65 and the phototube 67 is supplied from a power supply box 70 which also amplifies the signal received from the phototube 67 and sends it to a solenoid provided in the label machine.

Figure 13:
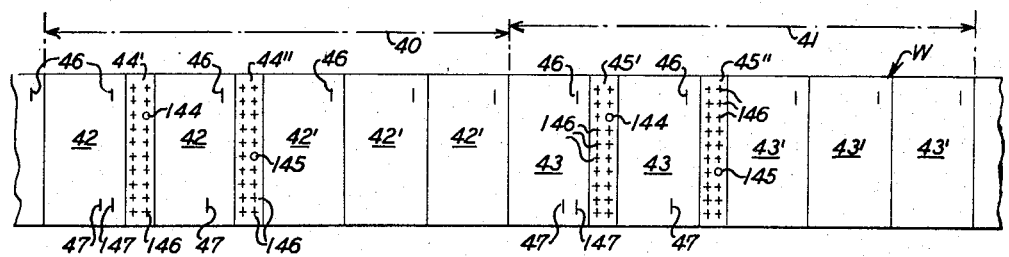
FIG. 13 is a plan view of a portion of a printed label web provided with verifying symbols in the sections thereof to be removed.

FIG. 13 of the drawings illustrates another arrangement of the control elements 46, 47 and the manner in which the space increments 44 of FIG. 10 may be employed for the location of the label verification marks whether constituted of punched holes, or of a visible, or invisible ink. The stripe of web shown in FIG. 13 includes as in FIG. 10 of the drawings, two repeat lengths 40 and 41 each provided with five labels 42, 42' and 43, 43' respectively. Associated with each label along one longitudinal edge of the web is a control element 46 for controlling the registration of the labels with the knife blades. The control elements 47 for controlling the operation of the knife blades are located along the other longitudinal edge of the web. The increment areas 44' and 45' of the repeat lengths 40 and 41, respectively, and the increment areas 44", 45" of such repeat lengths, respectively, are utilized for the location of the label verification marks 144, 145, respectively. It will be noted that there is one mark 144 and one mark 145 in each repeat length of the web and that the marks 144 and 145 are offset longitudinally. Accordingly, all of the labels in each repeat length can be verified by scanning the two marks in each repeat length and both of such marks must be scanned in order to provide proper verification. The + marks 146 in the increment areas 44', 44", 45', and 45" indicate other possible positions in which the verifiying control elements or symbols may be located in such areas. Located in alignment with the control elements 47 is a control element 147 in each repeat length 40 and 41 for triggering the verifying device to read both increment areas in each repeat length simultaneously. Inasmuch as the control marks 144 and 145 are offset longitudinally the verifying device will be provided with two electric eyes for the reading of such marks.

It will be understood from the foregoing, that as the web W is fed in a step-by-step fashion to the left as viewed in FIG. 13, the control elements 46 will be scanned by one electric eye which will control the feed of the web to cause the trailing edges of the terminal labels to stop at the line of cut of the cutting blades. Another electric eye will scan the control elements 47 to effect the unlatching of the set of blades 37, 38 to cut away the increments 44', 44", 45', 45", etc. This second electric eye will also scan the mark 147 provided on each repeat length of web to cause the two electric eyes provided to read the marks 144 and 145, to read the latter simultaneously before the first increment 44' or 45' is cut out by the set of blades. As only one of these control marks 147 occurs in every repeat length of the web, the two electric eyes in the verification scanner must be triggered to read such marks 144, 145 just after the knife electric eye gets the signal from the mark 47 associated with the first increment 44' or 45' in the repeat length that is coming up. If the two verification eyes find the marks 144 and 145 the machine will continue its normal operations. Should the marks or control elements 144 and 145 not be found by the verification device, the means associated therewith will operate to stop the machine. The second knife control elements 47 associated with the increments 44" and 45" do not have a verifying control element associated therewith so that the verification scanner will not be readied for operation after such scanned elements 47 have been read. The above referred to four electrical eyes, or other scanning means, such as the scanning means shown in FIG. 12 of the drawings, may be contained in a single scanning device 48 and instead of utilizing an electrical circuit switching means in the power box 70, the electrical circuit of the latter may be constructed in a known manner, to send the amplified electrical impulses from the scanning means associated with the control elements 46 directly to the roll feed solenoid 71, to send the amplified electrical impulses from the scanning means associated with the control elements 47 and 147 directly to the knife solenoid 110, and to send the amplified impulses resulting from the combined readings of the verification marks 144 and 145 by the two scanning means associated therewith, to either the roll feed solenoid 71, or to a switch controlling the motor circuit, or to a light or sound signal.

Figure 14:
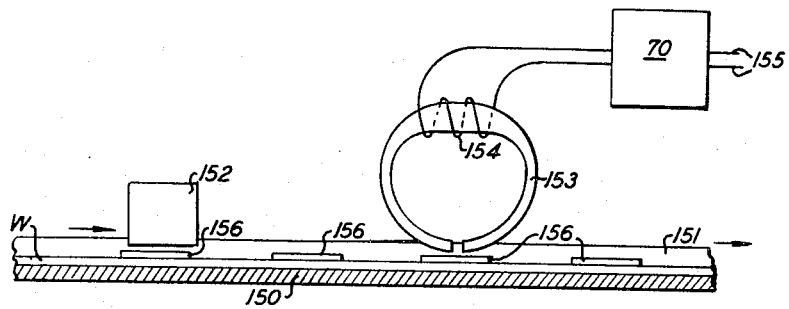
FIG. 14 is a schematic, elevational view, partly in section, of a scanning means for detecting characters printed on the web with magnetic ink.

When the control or verification marks are constituted of magnetic ink, the scanning device 48 is preferably constituted of one or more magnetic detectors, their number depending on whether such marks are contained in one or more lines extending longitudinally of the label web. As is shown in FIG. 14 of the drawings, the scanning device may include a base 150 over which the web W is drawn in the direction of the arrows between the two side guides 151 for maintaining the moving web in proper registry with the magnetic detector or detectors. A pole piece 152 in the form of a permanent magnet is arranged to overlie one or more longitudinal lines of marks on the web in position with respect to the web so that as the latter passes therebeneath the magnetic ink in the characters or marks 156 constituted thereof, will become magnetized. The web then passes beneath a split-ring-shaped highly permeable magnetic core 153 having a coil 154 wound around its central portion. The coil 154 is connected to the power supply box 70. It will be understood that as the magnetized ink material in a control or verifying character or mark passes by the narrow space between the legs of the core 153 in the feed of the label web, the lines of force created by the coil 154 will be disturbed to the extent that an electrical pulse is created. This pulse is conducted to the power box 70 where it is amplified and then transmitted by the wires 155 to a suitable device, such as the solenoids 71 or 110 or the motor circuit switch, or signal device 71'.

Figure 15:
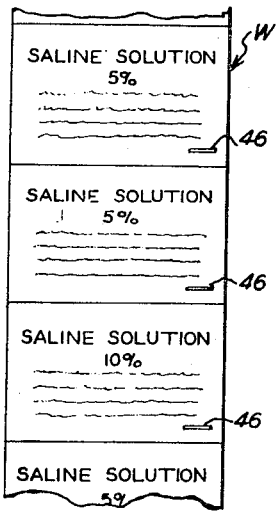
FIG. 15 is a plan view of a portion of a label web provided with feed control elements and optically recognizable characters.

When the labels are printed so that they can be checked by optical character recognition as previously indicated, it is necessary to utilize a still different type of scanning device. It might be pointed out at this time, that this method enables the checking of the labels without the necessity of applying to the labels verification control elements or special coding characters and of maintaining complicated and costly records of the different coding systems used. For instance, as is indicated in FIG. 15 of the drawings, if a production line in a pharmaceutical plant is putting out a product that varies only in the strength of solution, say 5%, 10% and 15% solutions, the labeling machine may be set up to optically recognize in the first instance the character 5, and in the second instance the character 10, and in the third instance the character 15. Thus, if by any chance the labels become mixed in a roll, the labeling machine would be arranged to shut down if it had been set to recognize the character 5 and 10 or 15 appeared. In those labels that do not bear a simple numeral to scan, the optical character recognizer could be set to read the title of the label, such as the term "aspirin." If by chance an "acetanilide" label, or any label that did not carry the term "aspirin" in the particular font of type used on the particular "aspirin" label, became spliced in the label roll, the machine would be shut down, or the operator's attention would be called in any desired manner to the fact that something is amiss with the labels. Also the amount of the label which the optical character recognizer or scanner would be arranged to recognize will depend to some extent on the type of material being labeled and the various ways in which it is packaged. For instance, aspirin is packaged in various flavors, varying weights, and different quantities. Accordingly, it becomes necessary to have the scanner include other portions or the whole of the label in its operations. For example, the scanner might be set to recognize the word "aspirin" in a given size and font of type, the weight of a tablet might be set as a number of a given size and font of type, and the characters indicating the flavor and quantity of the tablets in a container might also be set up in given sizes and fonts of type.

Figure 16:
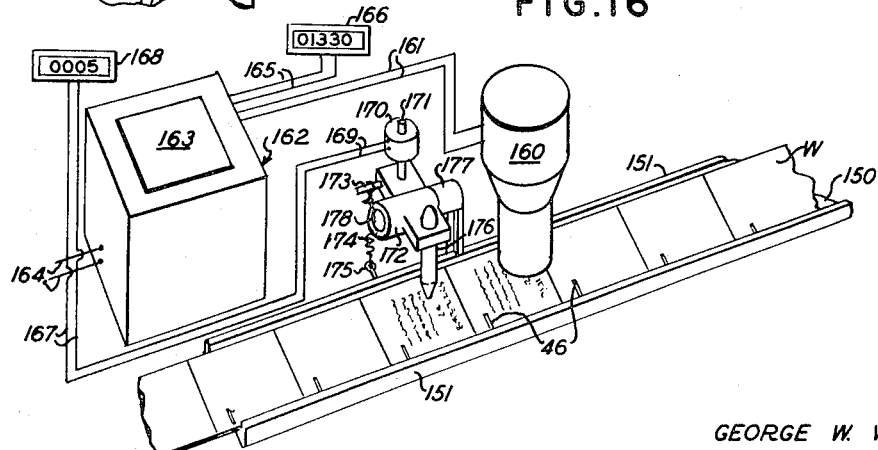
FIG. 16 is a diagrammatic, perspective view of optical-electrical scanning means for a label web.

Considering now the disclosures of FIGS. 15 and 16 of the drawings, FIG. 15 shows a label web W having labels provided with the previously discussed register control elements 46 to control the feed of the web so that the labels will properly register with the cutting mechanism in the step-by-step feed of the web, as has been explained. The labels shown are for containers filled with a 5% saline solution, but through inadvertence, one label for a 10% saline solution has been spliced in the roll. The scanning unit has been arranged to scan the area occupied by "saline solution 5%" and to recognize these particular characters, so that when it scans the area occupied by "saline solution 10%" it will reject "10%" as an unrecognizable character and call the attention of the operator to this discrepancy in the manner above indicated.

The scanning device employed for this purpose may be constructed to employ any one of the several optical-electronic systems now used in the optical processing of records, checks, bills, etc. Generally, as shown in FIG. 16 of the drawings, such a device would include a label web support 150 and side guides 151 (note FIG. 14) to properly register the labels with the scanning tube 160. The tube 160 may be a known type of electronic scanning tube known as a vidicon and capable of optically scanning the area of the labels containing the characters "saline solution 5%." The vidicon is connected by electric wiring 161 to a comparator 162 of known construction and known as an image orthocon. The comparator contains a scanning tube arranged by the aid of electronic oscillators in a known manner, to scan in synchronism with the tube 160 a master label 163 which is a correct copy of the labels in the web W being checked and which is preferably placed face down on the top of the comparator, as indicated. In the event there is any difference between the label in the web W, as in the case of the label marked "10%," and the master copy 163, a pulse is sent out through the output wires 164 to cause the actuation of the roll feed solenoid 71 or a motor circuit switch and/or signal device.

FIG. 16 of the drawings also illustrates additional features of the invention relating to the use of counting devices in the verifying circuit. Due to the ever increasing controls being applied by the drug manufacturer in an effort to eliminate errors as well as to prevent the pilfering of genuine labels from a reputable drug manufacturer and the risk of getting them into the hands of people working outside the pale of government control, it is necessary to keep an accurate count on every label issued by the label control group to the manufacturing floor. In order to exercise this type of control it has been found necessary to issue a counted roll of labels and to keep a constant check on the number of such labels as they are being used in the labeling machine. This check on the number of labels must cover not only the labels that were verified and used, but also the number of labels that were rejected.

Further, in the practical operation of a labeling machine it has been found that it is not always advisable to shut the machine down when a label has been rejected. This is especially true on very high speed lines. In such instances, in accordance with the invention, the verifying mechanism is so arranged that the labeling machine continues to run when a label has been rejected, but the signal is given to the attention of the labeling machine attendant who visually searches for the rejected label attached to a labeled article. In order to facilitate finding the rejected label the invention further contemplates providing means to mak the rejected label so that it can be readily distinguished from the rest of the labels, as will hereinafter be more fully explained.

To keep track of the labels scanned, the invention contemplates incorporating in the control circuit for the comparator 162 shown in FIG. 16 of the drawings, leads 165 connected to an electrically operated counter 166. This connection is such that when a label is brought to a pause in the step-by-step feed thereof under the control of the control elements 46, a pulse is transmitted from the comparator 162 to the counter 166 to cause the latter to advance one count. This counter 166 therefore keeps track of the number of labels which are scanned during the production run. However, in the scanning process it may be found that certain of the labels are not recognizable by the comparator 162. This will result in the comparator sending a pulse into the wires 164 which, as has been previously explained, may either signal the attendant in any suitable manner, as by a signal device or actuate a device in the labeling machine to control its operations. This pulse is also transmitted to wires 167 which in turn activates a counting device 168 for keeping track of the number of rejected labels. At the end of the run, therefore, the attendant will have a reading of the total number of labels scanned and the total number of labels rejected, which numbers will give by subtracting the one from other, the total number of labels on finished articles. Also by subtracting the total number of labels used from the quantity issued by the control group, the number left on the roll can be arrived at. The label control group then checks the number of return labels, and if all totals check out the labels are completely accounted for.

The means provided in accordance with the invention to identify rejected labels so they can readily be found by the labeling machine attendant, is also shown in FIG. 16 of the drawings. As shown, such mechanism includes a solenoid 170 connected to the wires 164 which carry the signal that a label is rejected, by another pair of wires 169. The core 171 of the solenoid is connected to a movable lever 172 which is pivoted on a shaft 178 that is in turn mounted on a fixed bracket 177 attached to a part of the labeling machine. Mounted on an arm of the lever 172 is an aniline marking pencil 176 of a color that will be different from the colors used in printing the labels, so that any mark made by the pencil 176 will be readily discernible. Also attached to the lever 172 is a spring pin 173 to which is attached one end of a tension spring 174, the other end of which is hooked in an eyebolt 175 mounted on a fixed part of the labeling machine.

From the foregoing, it will be understood that when the scanning tube 160 is called upon to scan a label that has been presented to such tube, the comparator 162 sends a pulse to the wires 165. Should a label be presented to the tube 160 that is not recognizable by the comparator 162 a second pulse is transmitted to the wires 164, 167 and 169. We have already explained the action of the pulse in wires 164 and 167. The pulse in the wires 169 will energize the solenoid 170 causing the core 171 to be moved and thereby rotating the lever 172 against the pull of the spring 174 to force the tip of the aniline ink pencil 176 into contact with the rejected label to put an identifying mark on the rejected label. As soon as the pulse dies and the solenoid is deenergized, the spring 174 will return the aniline ink pencil 176 to its normal retracted position in which it is out of contact with the label web. As previously explained, the distinguishing mark placed on the rejected label by the pencil 176, will readily be recognized by the operator whose attention has been called to the existence of such a label by the operated signal.

While I have hereinabove described and illustrated in the accompanying drawings a preferred embodiment of my invention, it will be apparent to those skilled in the art that various changes may be made therein without departing from the spirit of the invention and that certain of the features thereof may be employed to control means in a labeling machine other than the feeding and cutting means described. Thus, the control elements and scanning means described may be employed solely for label verification and may be utilized for this purpose to control the operation of the labeling machine, or even with mechanism other than a labeling machine. Hence, it is intended to cover all forms of the invention coming within the scope of the appended claims.

What is claimed is:

1. A continuous web having repeat series of items printed thereon, the successive series each having a fixed overall dimension similar to that of the peripheral surface of an offset printing cylinder provided with a plurality of printing areas of the item, and each of said fixed repeat series being composed of a given number of whole items produced by the printing areas of the printing cylinder and at least one nonitem section having a web length different from the web length of said whole items and which is to be cut away from the web and said whole items, said at least one nonitem section abutting at least one such item in each fixed repeat series and spacing apart two whole items on the web, and the remaining items in each fixed repeat series not spaced by such a nonitem section on the web being all adjacent one another, and each such nonitem section on the web in each fixed repeat series having a control element associated therewith on the web for controlling the severing of such nonitem section from an adjacent item.

2. A continuous web as defined in claim 1, in which the end and starting whole items in successive fixed repeat series are spaced from each other on the web by said nonitem section, so that the distance between such end and starting items is different from the distance between at least some of the items in the body of one of such repeat series, and a series of second control elements associated with said items for controlling the severing thereof from the web.

3. A continuous web as defined in claim 1, in which each of said fixed repeat series is composed of successive whole items adjacent each other, and a second control element associated with each item on said web for controlling the severing thereof from adjacent items and nonitem sections, the distance between successive said second control elements associated with successive adjacent whole items being different from the distance between the first mentioned control element associated with a nonitem section and the second control element associated with an item adjacent to said nonitem section.

4. A continuous web as defined in claim 1, in which each of said fixed repeat series is composed of at least one pair of whole items spaced apart on the web by a nonitem section.

5. A continuous web as defined in claim 4, in which each of said fixed repeat series is composed of successive whole items adjacent each other, and other successive whole items spaced apart by nonitem sections on the web, and comprising a second control element associated with each item on the web for controlling the severing thereof from adjacent items and nonitem sections, the distance between successive said second control elements associated with successive adjacent whole items being different from the distance between the first mentioned control elements associated with said nonitem sections and the second control elements associated with the items adjacent to said nonitem sections.

6. A continuous web as defined in claim 1, in which all of the items in each of said fixed repeat series have second control elements associated therewith in the label web for controlling the severing thereof from adjacent items and the nonitem sections on the web.

7. A continuous web as defined in claim 1, in which each item on the web includes printed characters peculiar to a given product and recognizable by optical-electrical verifying means, and other printed characters recognizable by electrical beam scanning means for controlling the feed thereof in a machine handling such given product.

8. A continuous web having repeat series of labels printed thereon, the successive series each having a fixed overall dimension similar to that of the peripheral surface of an offset printing cylinder provided with a plurality of printing areas of the labels, and each of said fixed repeat series being composed of a given number of labels for a given product produced by the printing areas of the printing cylinder and at least one nonlabel section having a web length different from the web lengths of the labels and which is to be cut away from the web and the labels, said at least one nonlabel section abutting at least one label in each fixed repeat series and spacing apart two labels on the web, and the remaining labels in each fixed repeat series not spaced by such a nonlabel section on the web being all adjacent one another, first control elements associated with the labels on the web for controlling the severing thereof from adjacent labels and nonlabel sections, second control elements associated with the nonlabel sections on the web for controlling the severing of such nonlabel sections from adjacent labels, and third control elements associated with the repeat series for verification of the labels in such repeat series, such third control elements providing a combination unique with respect to the particular labels on the web for such given product and different from such a combination for labels for a different product.

9. A continuous web as defined in claim 8, in which said third control elements are composed of two control elements associated with each repeat series and forming the combination unique for the particular labels for the given product in such associated repeat series.

10. A continuous web as defined in claim 9, in which said two control elements associated with each repeat series are located in longitudinally spaced relation within the length of such associated repeat series.

References Cited

UNITED STATES PATENTS

| 2,704,634 | 3/1955 | Raush | 250—71 UX |
| 3,237,973 | 3/1966 | Rumberger | 283—62 |
| 3,035,380 | 5/1962 | Leavens | 53—47 |
| 2,742,631 | 4/1956 | Rajchman et al. | 250—71 UX |

(Other references on following page)

UNITED STATES PATENTS

| | | | |
|---|---|---|---|
| 3,169,432 | 2/1965 | Hoffman et al. | 83—371 X |
| 3,140,214 | 7/1964 | Von Hofe | 156—351 |
| 3,291,675 | 12/1966 | Orloff et al. | 156—277 X |
| 2,946,281 | 7/1960 | Sohn | 156—384 X |
| 2,525,741 | 10/1950 | Von Hofe et al. | 156—499 |
| 3,162,565 | 12/1964 | Miller et al. | 156—159 X |
| 3,340,678 | 9/1967 | Rhodes | 156—510 X |
| 3,026,236 | 3/1962 | Hein et al. | 156—355 |
| 3,010,864 | 11/1961 | Schneider et al. | 156—64 |
| 3,212,950 | 10/1965 | Philippi | 156—351 |

WILLIAM D. MARTIN, Primary Examiner

B. D. PIANALTO, Assistant Examiner

U.S. Cl. X.R.

117—4, 33.5, 38, 235